UNITED STATES PATENT OFFICE.

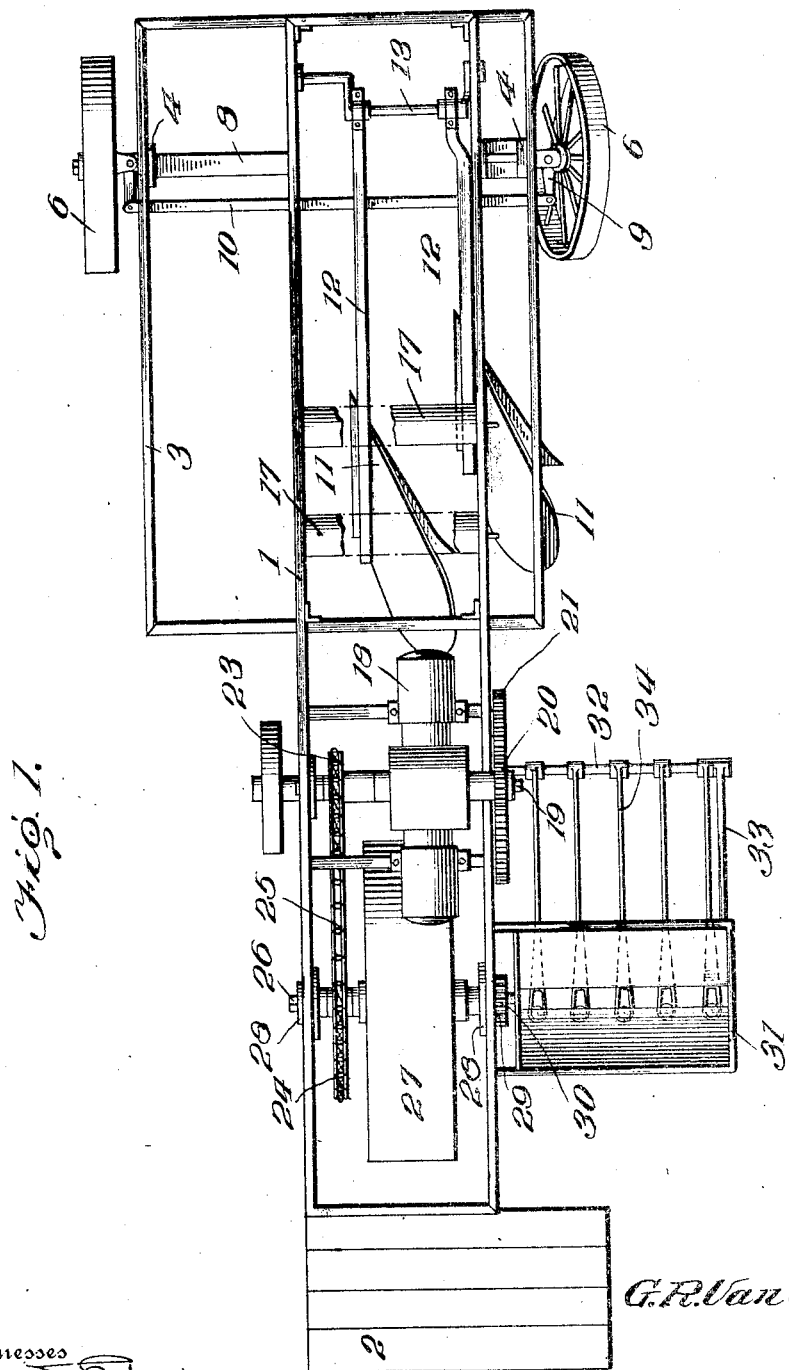

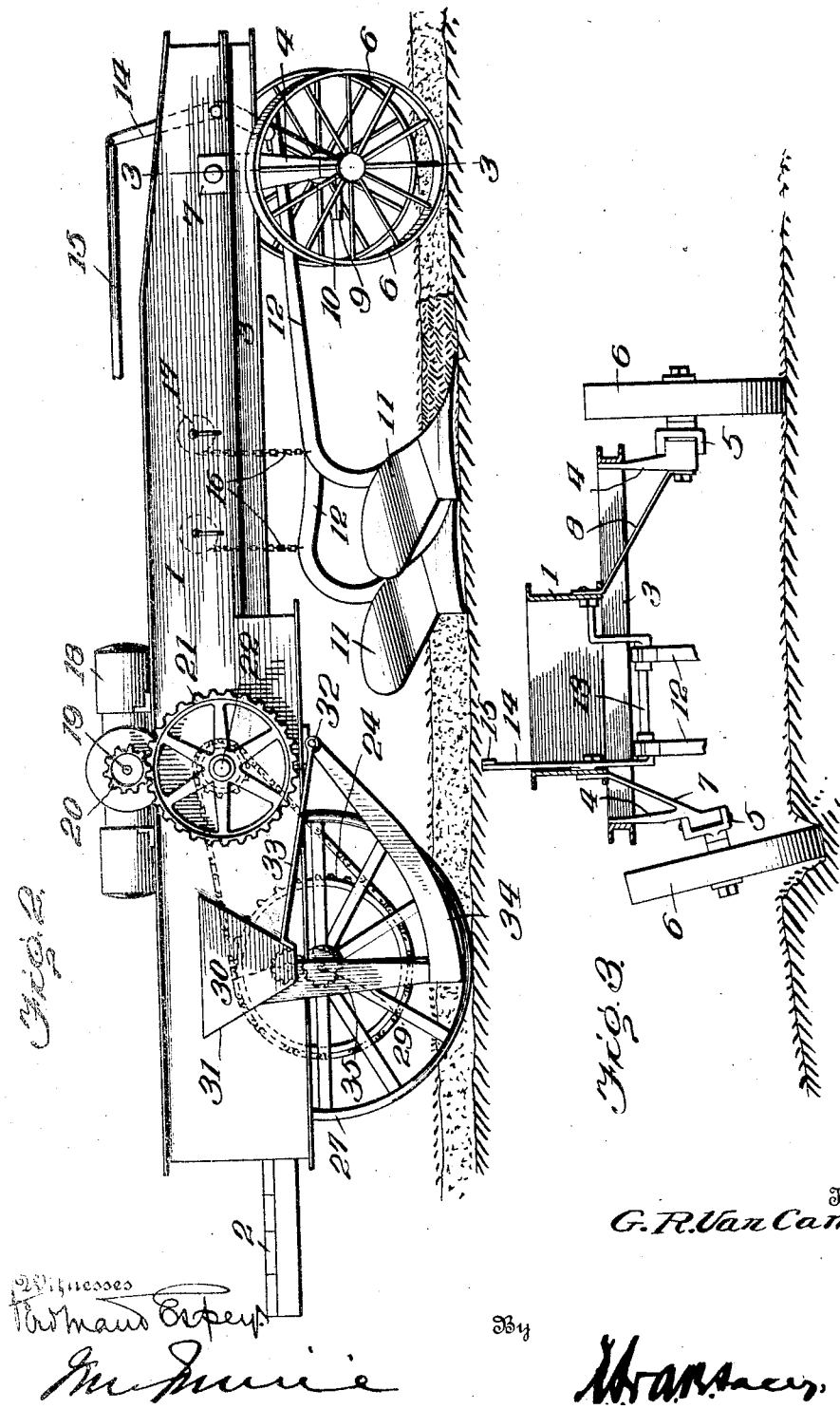

GORDON R. VAN CAMP, OF DRAYTON, NORTH DAKOTA.

MOTOR PLOW AND PLANTER.

1,094,277.

Specification of Letters Patent. Patented Apr. 21, 1914.

Application filed June 11, 1913. Serial No. 773,071.

*To all whom it may concern:*

Be it known that I, GORDON R. VAN CAMP, citizen of the United States, residing at Drayton, in the county of Pembina and State of North Dakota, have invented certain new and useful Improvements in Motor Plows and Planters, of which the following is a specification.

The object of this invention is to provide a motor propelled machine of simple construction by which the operations of turning the ground and planting seed in the turned ground may be simultaneously performed.

A further object of the invention is to provide means whereby the machine may be readily held to its work and a single traction wheel utilized to propel the machine, and, at the same time, operate the seeding mechanism.

The invention also has for its object to improve, generally, the construction and arrangement of the parts of a machine for the stated purpose to the end that the durability and efficiency of the same may be increased without increasing the cost of production and maintenance.

The several stated objects, and such other incidental objects which will appear as the description of the invention proceeds, are attained in a mechanism of the type illustrated in the accompanying drawings, and the invention consists in certain novel features which will be particularly pointed out in the claims following the description.

In the drawings: Figure 1 is a plan view of a machine embodying my present improvements; Fig. 2 is a side view of the same; Fig. 3 is a transverse section on the line 3—3 of Fig. 2 with parts removed.

In carrying out my invention, I employ a main frame 1 which is preferably constructed of channel bars rigidly secured together by any suitable means, and to the rear end of said frame I secure a platform 2 to carry the operator. The forward portion of the main frame is reduced in height by cutting away the lower sides thereof, as shown most clearly in Fig. 2, and within the said reduced or cut-away portion I secure a supplemental frame 3 which projects laterally beyond the main frame, as shown in Figs. 1 and 3. To the sides of the said supplemental frame, near the front end thereof, I secure hangers 4 and to the lower ends of said hangers I pivotally attach yokes 5 having trunnions extending laterally therefrom, steering or guiding wheels 6 being mounted upon the said trunnions. The hanger 4 at the right-hand side of the machine is provided with an upwardly and inwardly extending bracing arm 7 which is rigidly secured to the side of the main frame, and a brace 8 occupies an analogous position upon the left-hand side of the machine and is rigidly secured at its upper end to the main frame and at its lower end to the hanger. The yokes 5 are provided with rearwardly extending arms 9 which are connected by a radius rod or link 10 to which is operatively connected any convenient or preferred form of steering device, the said steering device not being illustrated as it may be of any well-known type and constitutes no part of my present invention. Upon reference to Fig. 3, it will be noted that the steering wheel at the left-hand side of the machine is appreciably offset from the main frame so that it will always run on the unplowed ground, while the steering wheel at the right-hand side of the machine is set closer to the main frame and is obliquely disposed so that it will run in a previously formed furrow and thereby assist in resisting the lateral thrust put upon the machine by the plows.

The plows 11 are of the ordinary type and are disposed below the main frame, and in the illustrated arrangement are disposed between the side bars thereof, the beams 12 of the plows extending forwardly to a point near the front end of the frame where they are hung upon a crank 13 which has its ends journaled in the side bars of the main frame and is equipped at one end with an upwardly extending lever arm 14 from which an operating rod 15 extends rearwardly to a point within convenient reach of the operator. This operating rod 15 may be provided with the usual latch or any other preferred device for holding it in its adjusted position, and it will be readily understood that by adjusting the crank 13 the front ends of the plow beams may be set higher or lower relative to the frame and the depth to which the plow device will take into the ground may thus be regulated. In order to lift the plow bodies clear of the ground when the machine is to be moved from one field to another or into a storehouse, I provide chains 16 which are attached to the beams near their rear ends and extend upwardly to windlasses or winding drums 17 mounted in the main frame. These windlasses may be of any ordinary construction and equipped with any preferred form of operating and holding devices.

The machine is driven over the field by the power generated in an engine 18 of the internal combustion type which is illustrated conventionally in the drawings. The engine is supported upon the main frame in any convenient manner and its driving or crank shaft 19 is equipped with a pinion 20 which meshes with a gear wheel 21 fixed upon a counter-shaft 22 journaled in and extending between the side bars of the main frame. This counter-shaft is also equipped with a sprocket pinion 23 over which and a sprocket wheel 24 a sprocket chain 25 is trained. The said sprocket wheel 24 is rigidly secured upon the axle 26 of the traction wheel 27 and said axle is journaled in suitable bearings 28 secured upon the side bars of the main frame, one end of the axle being extended slightly beyond the adjacent side bar of the frame. The traction wheel 27 is disposed between the side bars of the frame so that it will run directly behind one of the plows and in the furrow made by the same. Upon the extended end of the axle 26 is secured a pinion 29 which meshes with a pinion 30 on the end of a seed stirrer shaft which extends into and through the hopper 31 which is secured rigidly to and extends laterally from the main frame. In advance of the hopper a rod or bar 32 is secured to and extends laterally from the main frame, and the outer end of said rod is supported by a brace 33 extending therefrom to the hopper, as clearly shown. A gang of shoes 34 are fitted at their front ends upon the said rod and extend downwardly and rearwardly therefrom so as to run upon the ground below the hopper, and seed spouts 35 extend from the hopper to the respective shoes. The seed stirring mechanism may be of any usual type and it will be readily understood that by the operation of the same the seed is fed into the seed spouts and gravitates through the same so as to be deposited within the ground immediately in rear of the small furrows produced by the shoes.

It is thought the operation of my improved machine will be readily understood. The power of the engine 18 is applied though the described gearing to impart rotary motion to the axle 26 and the rotation of the said axle will be transmitted directly to the traction wheel 27 so that the machine will be caused to travel over the field. As the machine progresses, the plows will, of course, take into the ground and turn over the same, and, simultaneously with said operation, the shoes 34 will run upon the ridges caused by the turning of the ground and reduce the same to an approximately level surface of pulverized dirt of the proper condition to obtain the desired results from the seed deposited from the seed spouts. While I have illustrated only two plows, it will be understood, of course, that any desired number of plows may be used and that either right or left hand plows may be employed and the steering mechanism arranged at the right or left hand side of the machine according to the type of plow used.

The parts of my improved machine are compactly arranged, so that a single operator may control the movements of all the parts and the planting of seed accomplished simultaneously with the breaking of the ground so that a large field may be quickly and effectually prepared for a crop and sowed. Inasmuch as a single traction wheel is employed and this wheel runs in the furrow produced by one of the plows, the seed will be planted evenly and will not be subject to fluctuations due to the machine passing over uneven surfaces or striking obstructions, and the steering wheels are so mounted as to be easily manipulated to guide the machine and, at the same time, thoroughly braced against lateral strain.

What I claim is:—

1. The combination with a wheeled frame, of plows carried by the same, a traction wheel mounted at the rear end of the frame and between the sides of the same, a seeding mechanism on one side of the frame operatively connected with said traction wheel, and means on the frame for rotating said traction wheel.

2. The combination with a main frame, of plows carried by the front end thereof, a traction wheel mounted in the rear end of the frame and between the sides of the same to run in the furrow formed by one of the plows, and a seeding mechanism operatively connected with said traction wheel and mounted on the side of the frame in rear of the plows.

3. The combination of a main frame, plows carried thereby, a single traction wheel mounted in the frame behind one of the plows, and a seeding mechanism mounted on the side of the frame and extending laterally beyond the same and operatively connected with said traction wheel.

4. The combination of a frame, plows carried thereby, a single traction wheel carried by the frame to run in the furrow formed by one of the plows, and a seeding mechanism mounted on the side of the frame and laterally beyond the same to travel in rear of some of the plows and operatively connected with the traction wheel.

5. The combination of a frame, plows carried thereby, a traction wheel carried by the frame behind one of the plows, and a seeding mechanism mounted on the side of the frame and operatively connected with the traction wheel, said seeding mechanism being arranged to travel over the ground turned by some of the plows.

In testimony whereof I affix my signature in presence of two witnesses.

GORDON R. VAN CAMP. [L. S.]

Witnesses:
   J. C. T. COLLEY,
   C. J. SOLIBAKKE.